United States Patent [19]

Young et al.

[11] 3,729,727

[45] Apr. 24, 1973

[54] APPARATUS FOR REMOTE TELEMETERING

[75] Inventors: Robert Leonard Young, Florence, Ky.; Daniel Arron Seltzer, Cincinnati, Ohio

[73] Assignee: Gamon-Calmet Industries, Inc., Florence, Ky.

[22] Filed: Sept. 10, 1971

[21] Appl. No.: 179,335

[52] U.S. Cl. ..............340/188, 340/206, 346/14 MR

[51] Int. Cl. ..............................................G08c 19/00

[58] Field of Search .......................340/188 R, 177 R, 340/206, 150, 151; 346/14 MR; 324/113

[56] References Cited

UNITED STATES PATENTS

| | | | |
|---|---|---|---|
| 3,006,712 | 10/1961 | Eichacker | 346/14 MR |
| 3,474,434 | 10/1969 | Lindberg et al. | 340/177 R |
| 3,422,441 | 1/1969 | Chapsky | 346/14 MR |
| 3,193,635 | 7/1965 | Hood, Jr. | 200/51.09 |
| 3,069,669 | 12/1962 | Wapner | 340/188 R |
| 3,228,243 | 1/1966 | Woolf | 340/206 |
| 3,069,670 | 12/1962 | Rondeau et al. | 340/188 R |
| 3,518,652 | 6/1970 | Dransfield et al. | 340/177 R |
| 3,376,567 | 4/1968 | Brothman et al. | 340/188 R |

OTHER PUBLICATIONS

Bulletin: "Automatic Reading Billing," Neptune Meter Co., Form ARB1-1, May 1966.

*Primary Examiner*—John W. Caldwell
*Assistant Examiner*—Robert J. Mooney
*Attorney*—Lerner, David & Littenberg

[57] ABSTRACT

A system is disclosed for remotely providing information relating to the flow of fluid through a fluid meter with the system comprising: a register positioned on the fluid meter, with the register including an odometer sub-assembly comprising odometer wheels responsive to the flow of fluid through the meter for providing indication of such fluid flow and printed circuit boards cooperating with odometer wheels for providing electrical signals representative of fluid flow with the printed circuit boards having exposed contact pad areas thereon; the system further including a register cover enclosing the register with the register cover including an access opening for exposing the contact pad areas of the printed circuit boards; and the system further including a connector removably secured to the register cover with the connector including a printed circuit board engaging portion passing through the access opening of the register cover into removable engagement with the printed circuit boards and the connector further including an enclosure removably secured to the printed circuit board engaging portion of the connector for receiving the ends of cables utilized to transmit the electrical signals to a remote location. To facilitate electrical connection, the printed circuit board engaging portion of the connector carries a plurality of pins one end of which engages a respective contact pad area on the printed circuit boards within the register and the other ends of which pass into the enclosure of the connector wherein there is disposed an apertured printed circuit board which facilitates the electrical connection of the pins to the ends of the cabling. The odometer sub-assembly is a modular component removable from the register thereby easily permitting the replacement of conventional odometer subassemblies with odometer sub-assemblies having printed circuit boards associated therewith when it is desired to provide a register with remote telemetering capabilities. In like fashion, the access opening provided in the register cover is normally sealed by a removable plate which is removed to permit the insertion of the aforementioned printed circuit board engaging portion of the connector when converting to remote telemetering operation. A remotely located receptacle is electrically connected to the other end of the cabling and provides an output point from which electrical information representative of fluid flow through the meter can be taken. The receptacle is housed in a novel structure readily facilitating removal, replacement and repair associated therewith.

20 Claims, 8 Drawing Figures

INVENTORS
DANIEL A. SELTZER
ROBERT L. YOUNG
BY
LERNER, DAVID & LITTENBERG
ATTORNEYS

APPARATUS FOR REMOTE TELEMETERING

FIELD OF THE INVENTION

This invention relates to systems for remotely providing information relating to the flow of fluid through a fluid meter and more particularly to certain improvements in such systems which facilitate assembly and disassembly and facilitate the conversion of a fluid meter without remote telemetering capabilities to a system having such capabilities.

BACKGROUND OF THE INVENTION

As well known in the art, a conventional fluid meter such as a water meter normally includes a register portion thereof wherein a series of odometer wheels are driven (by mechanical or magnetic coupling) in response to the flow of fluid through the meter.

In recent years, much emphasis has been placed on the desirability of being able to read the meter from a remote location thereby eliminating the requirement for the meter reader to enter the premises wherein the meter is situated and also making meter reading possible for meters which are generally inaccessible.

Generally speaking, remote telemetering of fluid meters such as water meters is being accomplished by either pneumatic or electrical means. Typical of pneumatic remote telemetering systems is the system described and claimed in the U.S. Patent application Ser. No. 769,602 filed Oct. 22, 1968 in the name of Ronald A. Munier and Norman L. Meyerson entitled "Pneumatic Remote Readout System for Meters" and assigned to the assignee of the instant invention now U.S. Pat. No. 3,626,696.

In terms of electrical remote telemetering, prior art systems have evolved employing printed circuit boards disposed between the odometer wheels of the register. The odometer wheels, normally plastic, carry metallic wipers which sequentially engage contacts circumferentially spaced apart on the printed circuit board such that the rotating wiper continually "makes" a unique electrical circuit representative of the odometer incremental rotation and therefore in turn representative of fluid flow through the meter. Conductive leads disposed on the printed circuit boards electrically bring the contacts out to the edge of the printed circuit board to thereby establish contact pad areas upon which an electrical connector may be received. The connector further transmits the electrical information representative of fluid flow to cabling the remote end of which is in turn connected to a remotely located receptacle which provides the intended take off point for meter reading and/or recordation.

The above-described prior art systems although generally functionally satisfactory suffer from many disadvantages which the instant invention effectively eliminates. Typical of the drawbacks prevalent in the prior art is the relative difficulty in assembling and disassembling the various components of the system, for example the remotely located receptacle portion thereof. Other problems prevalent in the prior art systems relate to the difficulty in initially assembling and deploying a remote telemetering system and, somewhat related thereto, the problem of simply and easily converting a non-telemetering system to one with remote telemetering capabilities. These problems are especially severe and troublesome since conversion customarily takes place in the field and sometimes without the help of relatively well trained personnel.

SUMMARY OF THE INVENTION

In contradistinction to the prior art, the remote telemetering system of the instant invention is relatively simple to assemble and disassemble and makes possible the simple conversion from non-telemetering to telemetering capabilities by unskilled personnel. Broadly speaking, the system of the instant invention includes a register (which is of course positioned in juxtaposition to the fluid meter) with such register including an odometer sub-assembly which is a modular component removably situated within the register. In this manner, it is a simple matter to replace an odometer sub-assembly which has not been provided with telemetering capabilities with an odometer sub-assembly having such capabilities. In association therewith, and in accordance with another aspect of the invention, the register cover which encloses the register is provided with an access opening which is normally closed by a removable plate when the register is being employed in a non-telemetering system. Of course, should the system being employed constitute a remote telemetering system, or in the situation where a non-remote telemetering system has been converted to telemetering capabilities (by the insertion of a proper odometer sub-assembly), such cover plate is removed thereby exposing the printed circuit boards of the odometer sub-assembly for connection to the printed circuit board engaging portion of the connector utilized to transmit information to the cabling which in turn is connected to the remotely located receptacle. The receptacle is supported within a protective housing in such a manner, to be described in further detail, that it is easily accessible when repair or replacement is required.

Accordingly, it is an object of the instant invention to provide a system for remotely providing information relating to the flow of fluid through a fluid meter.

It is another object of the instant invention to provide such a system which is easily assembled and disassembled and facilitates the conversion of a conventional meter to one having remote telemetering capabilities.

It is another object of the instant invention to provide a register for a meter which includes a removable odometer sub-assembly as a portion thereof.

These and other objects of the instant invention will be had by referring to the following detailed description and drawings which form a portion hereof.

DETAILED DESCRIPTION

Figure 1:
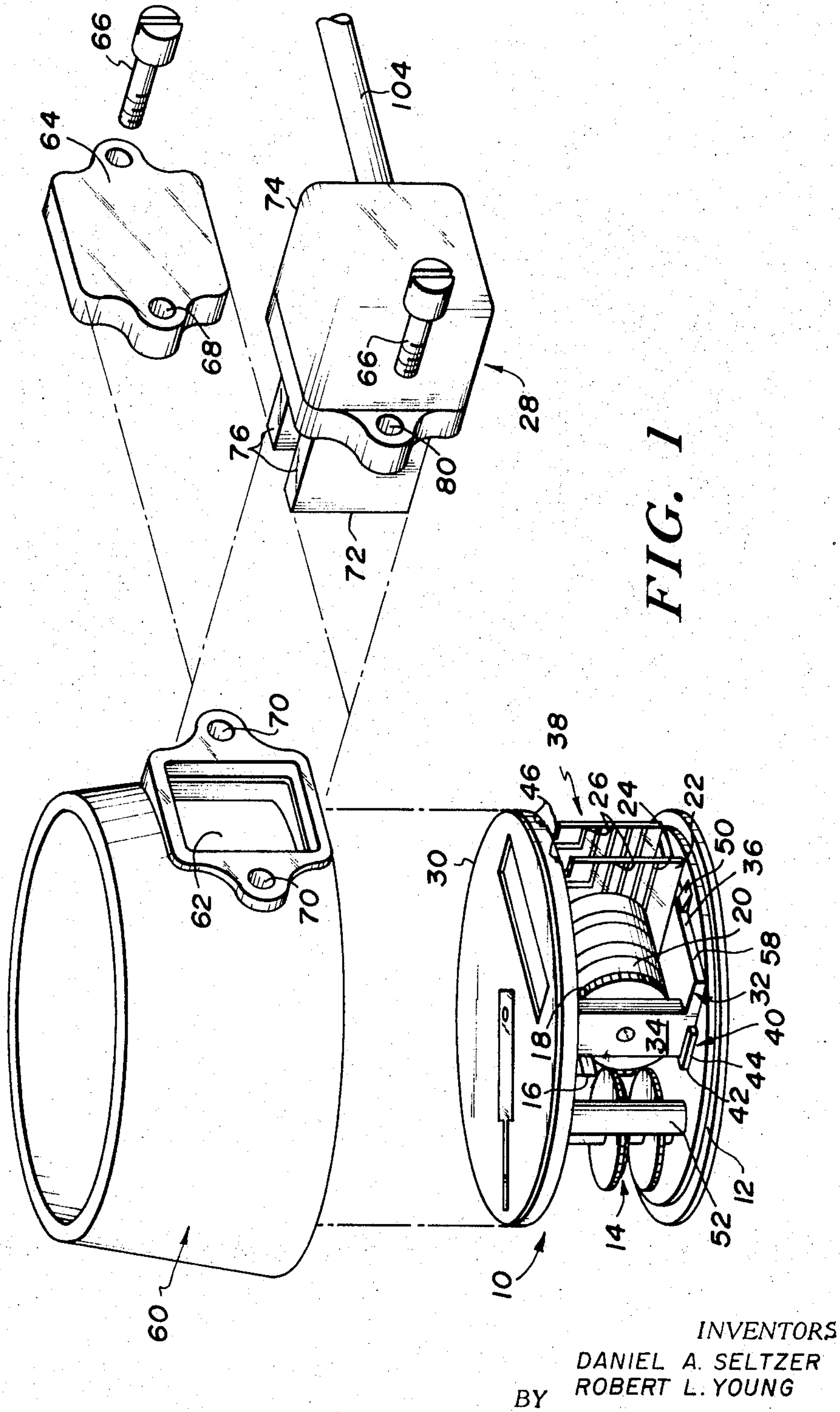
FIG. 1 is an exploded perspective view of a portion of a system of the instant invention.

Turning to the drawings, wherein like numerals are used to designate corresponding elements, there is illustrated in FIG. 1, a register 10 constructed in accordance with the instant invention. As well known in the art, such a register would be located in juxtaposition to a fluid meter (not shown) the flow through which is desired to monitor. Conventionally, the register 10 would include a driven magnet rotatably supported beneath the bottom plate 12 with such driven magnet being magnetically aligned with a driving magnet coupled to the element in the fluid meter which experiences repetitive motion in direct response to the flow of fluid through the meter. Typical of such construction is the meter shown and claimed in application Ser. No. 874,123 filed Nov. 5, 1969 and assigned to the assignee of the instant invention now U.S. Pat. No. 3,662,600. Thus when the driving magnet is rotated, the magnetic coupling rotates the driven magnet and such motion is imparted by way of gearing generally indicated at 14 to a worm drive 16 in turn meshed with a driving gear 18 which advances the odometer wheels 20 in a conventional fashion. In like manner, it is known to employ printed circuit boards 22 between pairs of odometer wheels when it is desired to remotely transmit electrical signals representative of the incremental rotation of the odometer wheels 20. Such printed circuit boards 22 carry circumferentially spaced apart contacts (not shown) which are sequentially engaged by metallic wipers carried by the odometer wheel which is to cooperate with the respective printed circuit board 22. In this manner, as the respective odometer wheel 20 rotates, individual circuits are sequentially "made" which upon the application of potential thereto will provide an indication of incremental rotation of the respective odometer wheel 20 and hence the flow through the meter. With the aid of conductive paths 24 connected to the respective contacts disposed on the printed circuit board 22, contact pad areas 26 are exposed at the edge of the printed circuit board 22 and thereby made available for connection to the connector broadly designated 28 in FIG. 1.

As noted previously, the register 10 thus far described is typical of the prior art register which has been employed in connection with remote telemetering of flow meters. However, in the prior art, those portions of the register 10 such as the odometer wheels 20 and the printed circuit boards 22 which are most concerned with the remote telemetering aspect are rather securely maintained between the bottom plate 12 and the top plate 30 of the register. Accordingly, servicing and replacement thereof is extremely difficult.

In contradistinction, in the register of the instant invention, the odometer wheels 20 together with the respective printed circuit boards 22 are carried by a generally U-shaped frame 32 having upstanding side walls 34 between which is disposed a generally planar bight portion 36. It will be appreciated that the frame 32 carrying the wheels 20 and printed circuit boards 22 thereby defines a modular self-contained odometer sub-assembly indicated as 38 in FIG. 7 which may be easily removed and replaced, in a manner to be further described, from within the remainder of the register 10. It will be appreciated that the removability of the sub-assembly 38 facilitates simple replacement and/or repair. Moreover, assuming that a register had been manufactured in the fashion illustrated in FIG. 1, but without the printed circuit boards 22 (such that the register would not have remote telemetering capabilities), it would be a relatively simple matter to remove the equivalent odometer sub-assembly 38 and replace it with a sub-assembly having the printed circuit boards 22 thereby simply and easily converting the register to one having remote telemetering capabilities.

Figure 7:
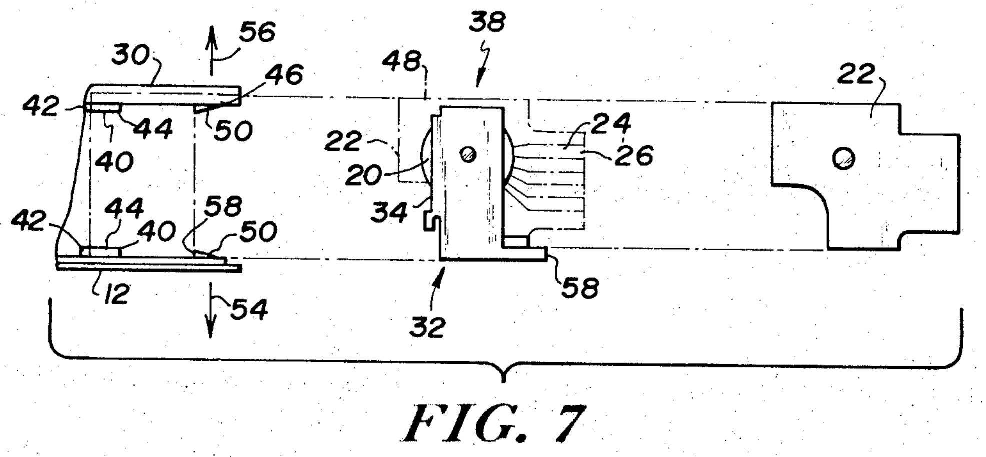
FIG. 7 is a somewhat schematic illustration of the manner in which the odometer sub-assembly of FIG. 1 may be replaceably removed from the register thereof.

Specifically, and as best seen in FIGS. 1 and 7, the bottom plate 12 and top plate 30 include a pair of upstanding projections 40 (only one of each pair being visible in FIG. 7) spaced apart by the length of the bight portion 36 of the frame 32. The projections 40 are generally L-shaped and include a base portion 42 which functions as a stop for the inward travel of the odometer sub-assembly 38 as it is slid inwardly between the side portions 44 of the projections 40. To further assist in guiding the movement of the sub-assembly 38, the undersurface of the top plate 30 of the register 10 includes a plurality of grooves 46 corresponding in number to the number of printed circuit boards 22. As seen also in FIG. 7, the grooves 46 guidingly receive the top edges 48 of the circuit boards 22.

Finally, the plates 12 and 30 further include upstanding beveled blocking members 50 which are positioned in the path of sliding movement of the frame 32 of the odometer sub-assembly 38 for retaining the odometer sub-assembly within the register. Finally, it should be noted that the top and bottom plates 12 and 30, although secured to one another by pole structures generally indicated at 52, are somewhat resiliently separable from one another. That is, one can grasp the plates 12 and 30 and slightly separate them in the direction of the arrows 54 and 56 of FIG. 7. Of course, the natural resiliency of the parts such as the poles 52 and the plates themselves would cause the plates to revert to their unstressed position once the separating force is removed.

From the above description, the method of removing and replacing the odometer sub-assembly 38 should now be apparent. Specifically, when assembling the register 10, the sub-assembly 38 is inserted in the register by aligning the upstanding edges 48 of the printed circuit boards 22 with the grooves 46 provided on the undersurface of the top plate 30 and then sliding the frame 32 inwardly between the side portions 44 of the upstanding projections 40. The inward movement continues until the frame 32 abuts the rear stop portions 42 of the projections 40 at which time the trailing edge 58 of the bight portion 36 of the frame 32 will have just passed the highest point of the beveled blocking members 50 (the plates 12 and 30 having been forceably separated as the frame rides up the beveled blocking members 50), and the natural resiliency of the parts will spring the plates 12 and 30 back to their natural position thereby locking the sub-assembly in place within the confines of the projections 40 and the blocking members 50. To remove the sub-assembly the reverse process is employed. One grips the plates 12 and 30 and pulls them apart in the manner illustrated in FIG. 7. This permits the bight portion 36 of the frame 32 to be lifted above the blocking members 50 and withdrawn from between the plates 12 and 30.

The versatility inherent in the above-described structure should now be apparent. Not only is it a relatively simple matter to remove a sub-assembly 38 for repair or replacement, However, and in accordance with a primary aspect of the instant invention, it will be appreciated that a register 10 might initially be manufactured with an odometer sub-assembly which does not include the remote telemetering capabilities made possible by the use of the printed circuit boards 22. However, if at a subsequent time, the user wishes to convert the register 10 to one having remote telemetering capabilities, he need only remove the original odometer sub-assembly, in a manner previously described, and easily replace it with an odometer sub-assembly such as 38 which has the required characteristics.

The register 10 is provided with a removable cover 60 having an access opening 62 which will expose the printed circuit boards 22 and the contact pad areas 26 thereon when the cover is seated in its proper position the register. Of course, the printed circuit boards 22 will only be exposed if the access opening 62 is in fact open and not covered by a plate 64 which may be removably secured to the cover 60 by means of screw threaded fasteners 66 which pass through apertures 68 in the plate 64 into screw threaded engagement with internally tapped passages 70 provided in the cover. As noted previously, with the access opening 62 in fact open, the connector 28 may be inserted therethrough for engagement with the printed circuit board 22 in a manner to be further described. However, in the situation where remote telemetering is not being employed, (for example, where the odometer sub-assembly has not been provided with printed circuit boards), the plate 64 would in fact be secured to the cover 60 to close the access opening 62. In effect, the provision of the removable plate 64 makes the register cover 60, like the register 10 itself, a universal member which may be employed whether or not remote telemetering capabilities have been provided.

Figure 2:
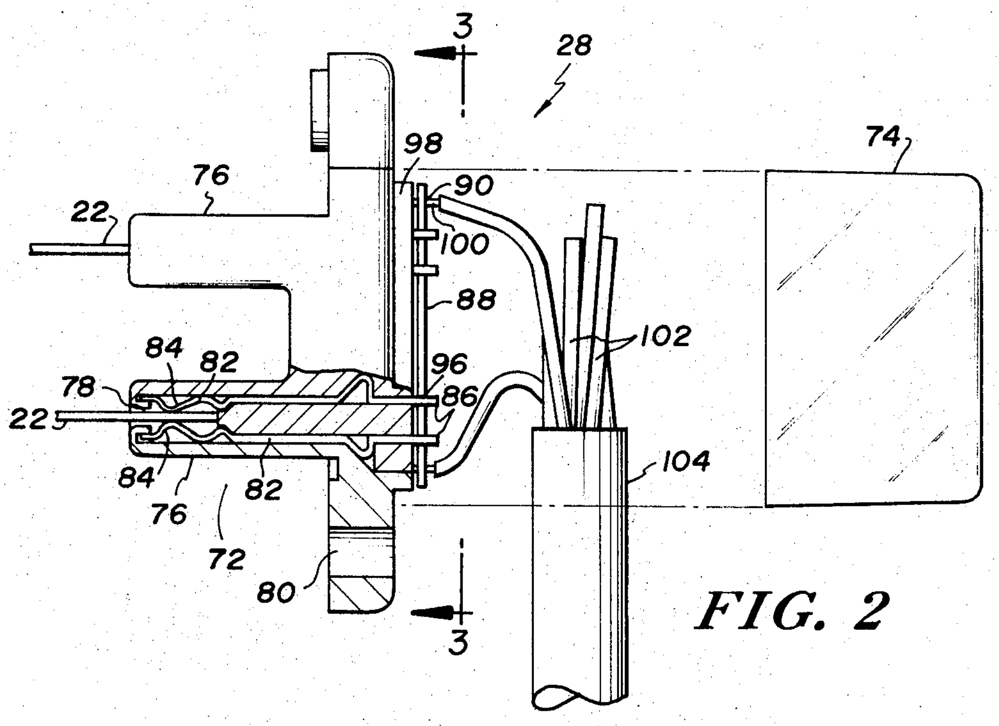
FIG. 2 is an exploded, partially sectional view of one of the components shown in FIG. 1.
Figures 3, 4:
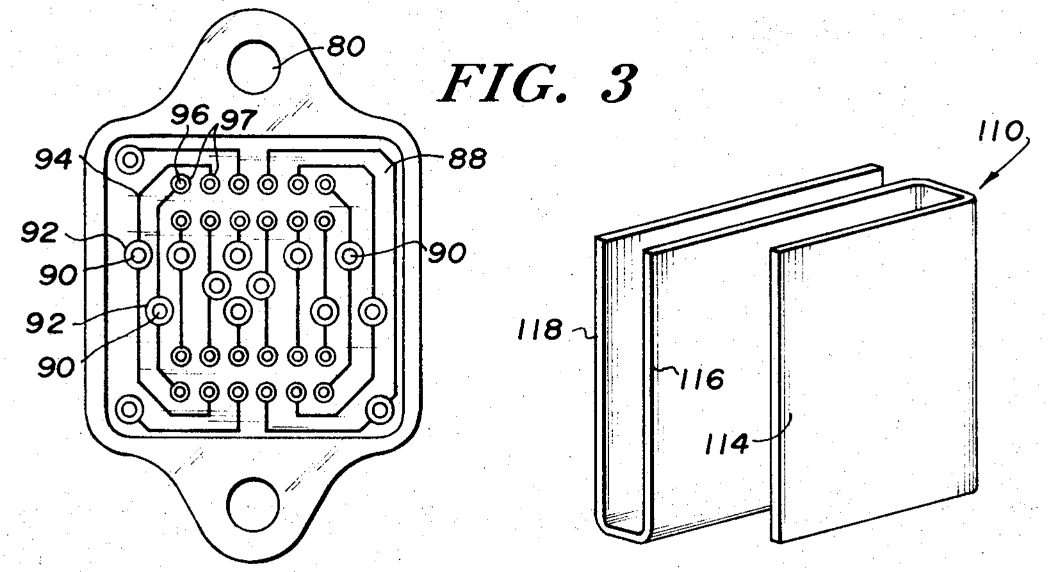
FIG. 3 is a plan view taken along the lines 3—3 of FIG. 2.
FIG. 4 is a perspective view of an alternative embodiment of an element employed in connection with the component illustrated in FIGS. 2 and 3.

With reference to FIGS. 1 through 3, the connector 28 generally includes two portions, a printed circuit board engaging Portion broadly designated 72 and a connector enclosure broadly designated 74. The printed circuit board engaging portion 72 actually comprises a pair of elongated receptacles 76 each one of which includes an elongated slot 78 in the forward surface thereof which telescopically receives the edge of an associated printed circuit board 22 when the printed circuit board engaging portion 72 is inserted through the access opening 62 of the cover 60. The connector 28 is maintained in its proper position by passing the screw threaded fasteners 66 through apertured projections 80 into screw threaded engagement with the tapped openings 70 in the cover.

As best seen in FIG. 2, each receptacle 76 carries a plurality of pins 82 which correspond in number to the number of contact pad areas 26 which happen to be disposed On the opposite sides of a respective printed circuit board 22. Each pin 82 has a forward contact area 84 which is resiliently biased into engagement with a respective contact pad area 26 and a second end 86 which projects into the enclosure region 74 of the connector 28.

Disposed within the enclosure region 74 is a printed circuit board 88 which has a plurality of apertures 90 having metallic rims 92 disposed thereabout. Conductive regions such as 94 disposed on the printed circuit board 88 electrically connect the metallic rims 92 to apertures such as 96 in turn provided with metallic rims 97. In assembling the connector 28, the printed circuit board 88 is pressed toward the support shoulder 98 such that the ends 86 of the pins 82 are frictionally urged through the apertureS 96 and hence into electrical engagement with the metallic rims 97. With this one simple motion, both physical securement and electrical contact is assured (although solder may additionally be employed if desired). Similarly, within the enclosure 74, respective ends 100 of cables 102 are passed through metallic rimmed terminal apertures 90 thereby aiding in physical securement and establishing electrical connection between a respective cable 102 and a corresponding pin 82 in turn electrically connected to a corresponding contact pad area 26 on the printed circuit board 22.

Figure 8:
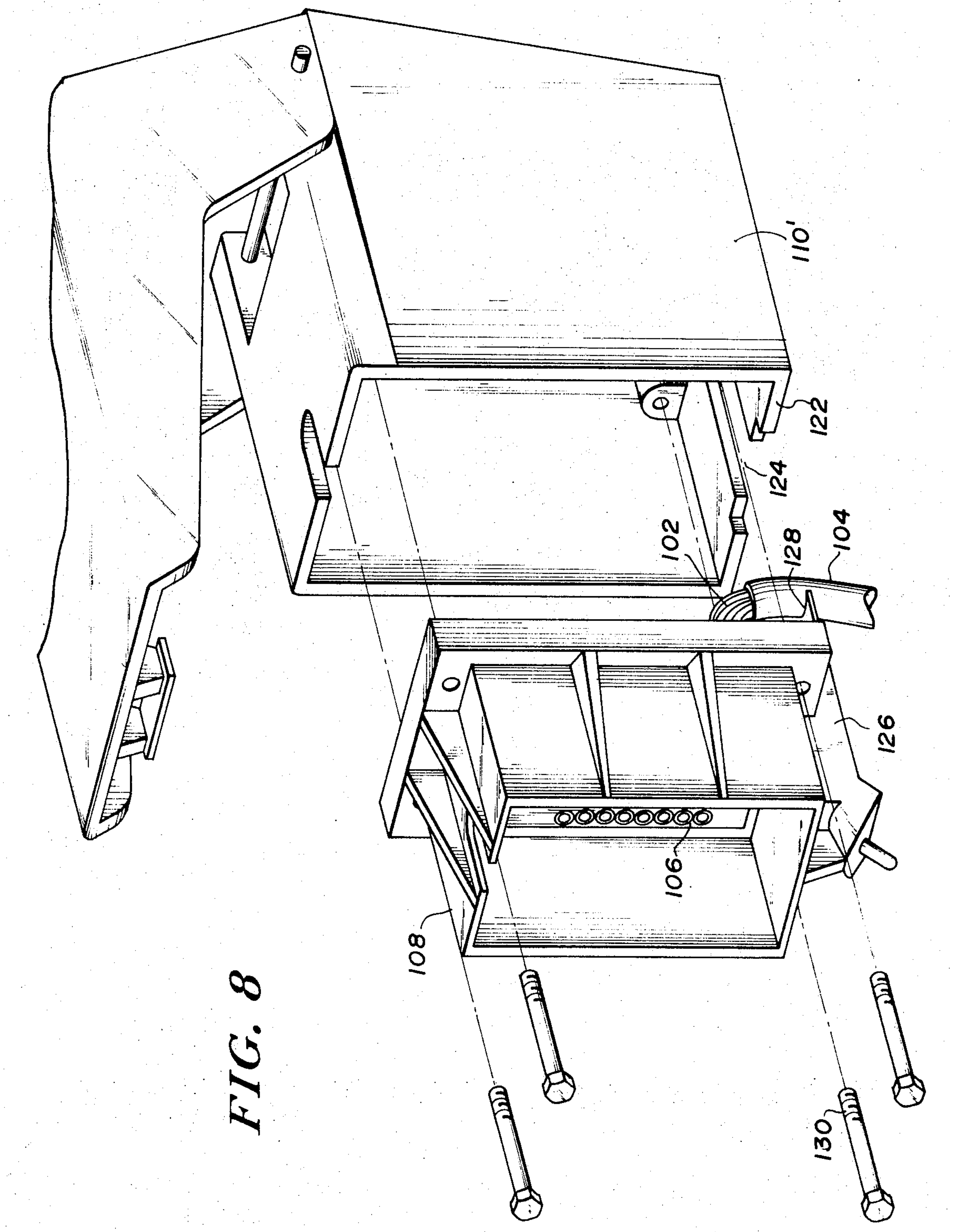
FIG. 8 is an exploded perspective view of a remote receptacle constructed in accordance with the instant invention.

As will be further described, the cables 102 are carried by a protective conduit 104 and connected to a remotely located plug receptacle 106 carried by a support structure 108 located within a protective outer housing 110' (FIG. 8). In the system of the instant invention, the plug-in receptacle 106 establishes the take off point for the electrical information representative of fluid flow through the meter. For example, a visual readout device such as of the type described and claimed in U.S. Pat. application Ser. No. 160,398 filed July 7, 1971 in the name of Daniel Seltzer entitled "Remote Visual Readout" and assigned to the assignee of the instant invention may be pluged into the receptacle 106 to provide a visual readout of the meter reading. A detailed description of the electrical characteristics of such a system including the instant invention and a remote visual readout device is found in the aforementioned application and incorporated herein by specific reference thereto. Alternatively, an appropriately designed recording device could be pluged into the receptacle 106 to record the meter reading.

Moreover, in U.S. Pat. application Ser. No. 103,067 filed Dec. 31, 1970, and assigned to the assignee of the instant invention now U.S. Pat. No. 3,700,816, there is described a remote telemetering system for reading utility meters such as a water meter over a switched telephone network. Such a system would include a telemetering register such as that disclosed in FIG. 1 of the instant application but in addition thereto and as described in the aforementioned application Ser. No. 103,067 (the details of which are incorporated herein by specific reference thereto) requires encoding circuitry including circuitry for converting the electrical information representative of the position of the odometer wheel 20 to a code which may be utilized by a data coupler to pass the information over a telephone network. In that application of the instant invention intended for use in a telephone telemetering system such as that disclosed in the aforesaid application Ser. No.

Figures 5, 6:
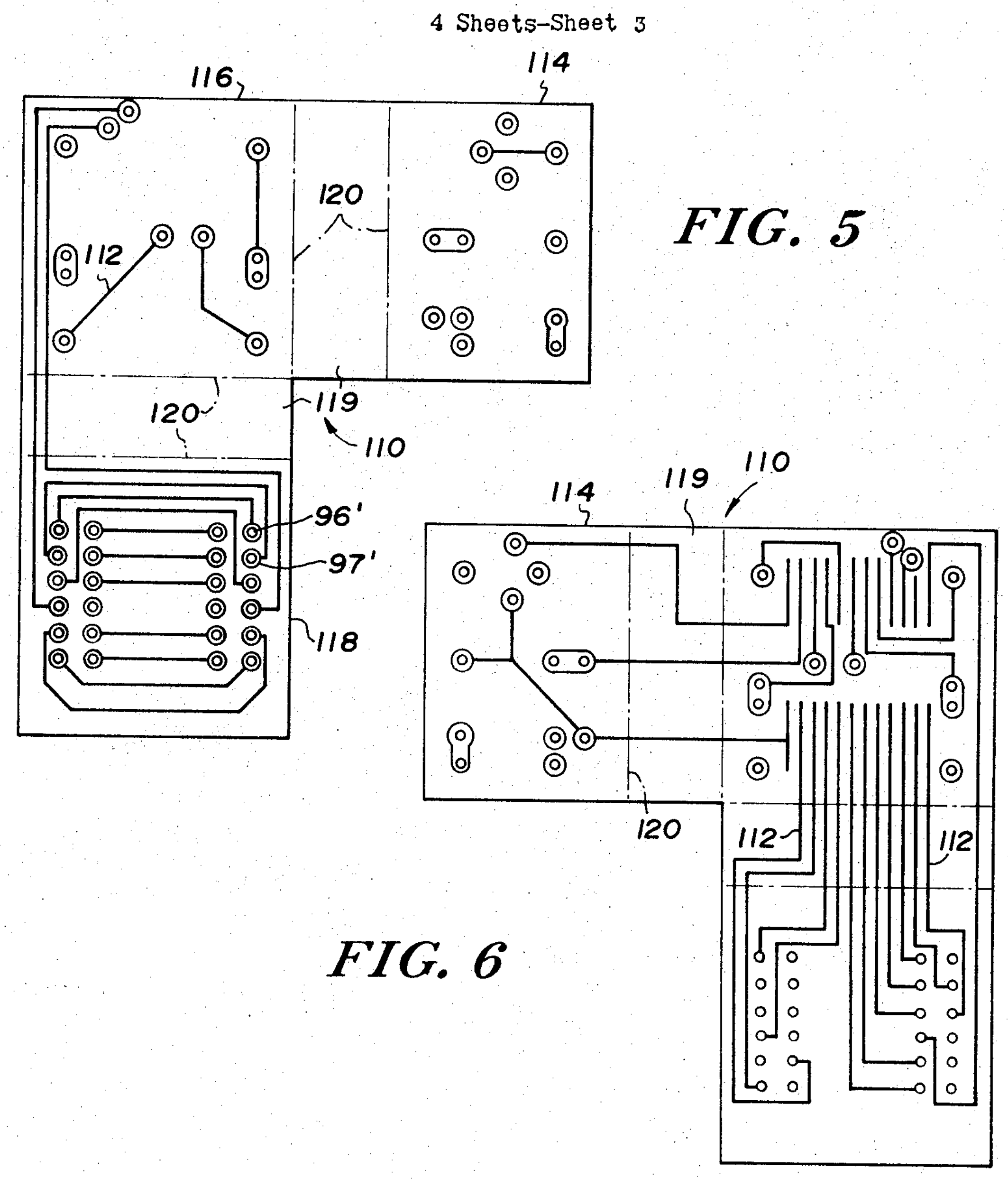
FIGS. 5 and 6 are plan views of opposite sides of the component shown in FIG. 4 prior to a folding operation being performed thereon.

103,067, the electrical components which comprise the encoding circuitry are physically plugged into a printed circuit board broadly designated 110 in FIGS. 4, 5 and 6 hereof. Such components are properly electrically connected by the various conductive regions such as illustrated at 112 in FIGS. 5 and 6. As best seen in these Figures, the printed circuit board 110 comprises A plurality of integrally joined areas 114, 116 and 118 joined by intermediate panels 119 and appropriately scored at 120 such that the entire board 118 can be folded to the configuration illustrated in FIG. 4. In such configuration, the printed board 110 with the encoding circuitry properly positioned and connected thereon can be inserted within the housing 74 of the connector 28 in the same manner that the printed circuit board 88 of FIG. 2 was positioned with respect to the ends 86 of the pins 82. That is, the ends 86 will snugly pass through the metallically rimmed apertures 96' of the area 118 of FIGS. 4 through 6 thereby physically securing the folded printed circuit board 110 within the housing 74 and simultaneously electrically connecting the pin ends 86 to the proper electrical components (not shown) of the encoding circuitry disposed on the printed circuit board 110 of FIG. 4. Thus it can be seen that the construction of the instant invention facilitates employment equally as well in a remote telemetering system of the type described in the aforesaid application Ser. No. 160,398 as well as in the telephone telemetering system of application Ser. No. 103,067.

Returning to FIG. 8, the receptacle structure disclosed therein is generally similar to those available in the prior art with one notable distinction. Specifically, it will be seen in FIG. 8, that a lower wall 122 of the protective housing 110' includes an elongated open ended slot 124 therein. Also, it will be seen that the receptacle bearing inner housing 108 includes an elongated depending projection 126 having a generally inwardly directed semicircular area 128 at one end thereof. As suggested in FIG. 8, such semi-circular area 128 cooperates with the open ended slot 124 to define a conduit passageway through the housing 110' when the inner housing 108 is secured therein by means of screw threaded fasteners 130. It will be appreciated, therefore, that when the inner housing 108 is removed from the housing 110', the conduit 104 with the cables 102 passing therethrough will all be available for servicing and repair. This is to be contrasted with the prior art equivalent structures wherein the conduit 104 simply passes through an aperture in a wall of the protective housing 110' and does not become disengaged or removable therefrom when the inner housing 108 is removed.

Thus there has been described a system for remote telemetering of a flow meter such as a water meter which is extremely simple in construction, simple to assemble and disassemble, universal in its application to various types of remote telemetering systems and easily convertible to telemetering capabilities if initially constructed without such capabilities.

Although this invention has been described with respect to its preferred embodiments, it should be understood that many variations and modifications will now be obvious to those skilled in the art, and it is preferred, therefore, that the scope of the invention be limited not by the specific disclosure herein, only by the appended claims.

We claim:

1. A system for remotely providing information relating to the flow of fluid through a fluid meter; said system comprising:

a register positioned on said meter, said register including an odometer sub-assembly comprising:

odometer means responsive to the flow of fluid through said meter for prOviding an indication thereof, and printed circuit board means cooperating with said odometer means for providing electrical signals representative of fluid flow, said printed circuit board means having exposed contact pad areas thereon;

register cover means enclosing said register, said register cover means including an access opening for exposing said contact pad areas of said printed circuit board means; and connector means removably secured to said register cover means, said connector means including;

a printed circuit board engaging portion passing through said access opening into removable engagement with said printed circuit board means; and a connector enclosure removably secured to said printed circuit board engaging portion for receiving one end of cables used for transmitting said electrical signals to a remote location.

2. The system of claim 1 wherein said printed circuit board engaging portion carries a plurality of pins one end of which engages a respective contact pad area and the other ends of which pass into said connector enclosure; and further including a printed circuit board located within said connector enclosure, said printed circuit board having a plurality of metallic rimmed apertures which receive said other ends of said pins, said one end of said cables being electrically connected to said metallic rimmed apertures.

3. The system of claim 1 wherein said odometer subassembly is removably positioned within said register.

4. The system of claim 3 wherein said access opening is normally closed by a plate removably secured to said register cover, said plate being removed to permit said printed circuit board engaging portion of said connector means to pass through said access opening.

5. The system of claim 4 wherein said register cover includes internally threaded passages which are aligned with apertures provided in said plate, and further including screw threaded fasteners removably passing through said apertures and into screw threaded engagement with said passages for removably securing said plate to said register cover;

said connector means including apertured projections aligned With said internally threaded passages; said fasteners passing through said projections and into said passages to secure said connector means to said register cover.

6. The system of claim 2 wherein said printed circuit board located within said connector enclosure comprises a plurality of integrally joined areas preselectively scored and folded to fit within said connector enclosure.

7. The system of claim 3 wherein said register includes a top and bottom plate between which said odometer sub-assembly is removably sandwiched.

8. The system of claim 7 wherein the undersurface of said top plate includes grooves therein for guidingly receiving the upstanding portions of said printed circuit board means.

9. The system of claim 8 wherein said odometer sub-assembly includes frame means for supporting said odometer means and said printed circuit board means; and said bottom plate of said register includes upstanding projections for guidingly receiving said frame means.

10. The system of claim 9 wherein said bottom plate of said register further includes upstanding blocking means positioned in the path of sliding movement of said frame means for selectively retaining said odometer sub-assembly within said register; said top and bottom plate being resiliently seperable to permit said frame means to overcome said blocking means when it is desired to remove said odometer sub-assembly from said register.

11. The system of claim 1 and further including receptacle means remotely located from said register, said receptacle means including an outer protective housing; and a receptacle-bearing inner housing removably located within said protective housing, second ends of said cables passing through said protective housing for securement to an electrical receptacle carried by said receptacle bearing inner housing.

12. The system of claim 11 wherein said protective housing includes an open ended slot in one walled surface thereof, and said inner housing including an elongated depending projection which is removably received by said open ended slot, one end of said elongated projection cooperating with said slot to define a passageway through said protective housing for said cable.

13. The system of claim 12 and further including cover means secured to said protective housing and selectively removable between a closed and open position to expose said receptacle.

14. The system of claim 9 wherein said upstanding projections are generally L-shaped and include side portions for guiding the movement of said frame means and stop portions positioned in the path of sliding movement of said frame means for locating the resting position of said frame means.

15. The system of claim 10 wherein said upstanding projections are generally L-shaped and include side portions for guiding the movement of said frame means and stop portions positioned in the path of sliding movement of said frame means for locating the resting position of said frame means; and wherein said blocking means includes a beveled member positioned from said stop portions of said upstanding projections by a distance corresponding to the width of said frame means.

16. A register for monitoring the flow of fluid through a meter, said register comprising:

an odometer sub-assembly including:

odometer means responsive to the flow of fluid through said meter for providing an indication thereof, and printed circuit board means cooperating with said odometer means for providing electrical signals representative of fluid flow, said printed circuit board means having exposed contact pad areas thereon; and register cover means enclosing said register, said register cover means including an access opening for exposing said contact pad areas of said printed circuit board means; and wherein said odometer subassembly is removably positioned within said register; and wherein said register includes a top and bottom plate between which said odometer sub-assembly is removably sandwiched.

17. The register of claim 16 wherein the undersurface of said top plate includes grooves therein for guidingly receiving the upstanding portions of said printed circuit board means.

18. The register of claim 17 wherein said odometer sub-assembly includes frame means for supporting said odometer means and said printed circuit board means; and said bottom plate of said register includes upstanding projections for guidingly receiving said frame means.

19. The register of claim 18 wherein said bottom plate of said register further includes upstanding blocking means positioned in the path of sliding movement of said frame means for selectively retaining said odometer sub-assembly within said register; said top and bottom plate being resiliently seperable to permit said frame means to overcome said blocking means when it is desired to remove said odometer sub-assembly from said register.

20. The register of claim 19 wherein said upstanding projections are generally L-shaped and include side portions for guiding the movement of said frame means and stop portions positioned in the path of sliding movement of said frame means for locating the resting position of said frame means; and wherein said blocking means includes a beveled member positioned from said stop portions of said upstanding projections by a distance corresponding to the width of said frame means.

* * * * *